(No Model.) 2 Sheets—Sheet 2.
G. M. CLARK.
SOIL WORKING MACHINE.
No. 512,276. Patented Jan. 9, 1894.
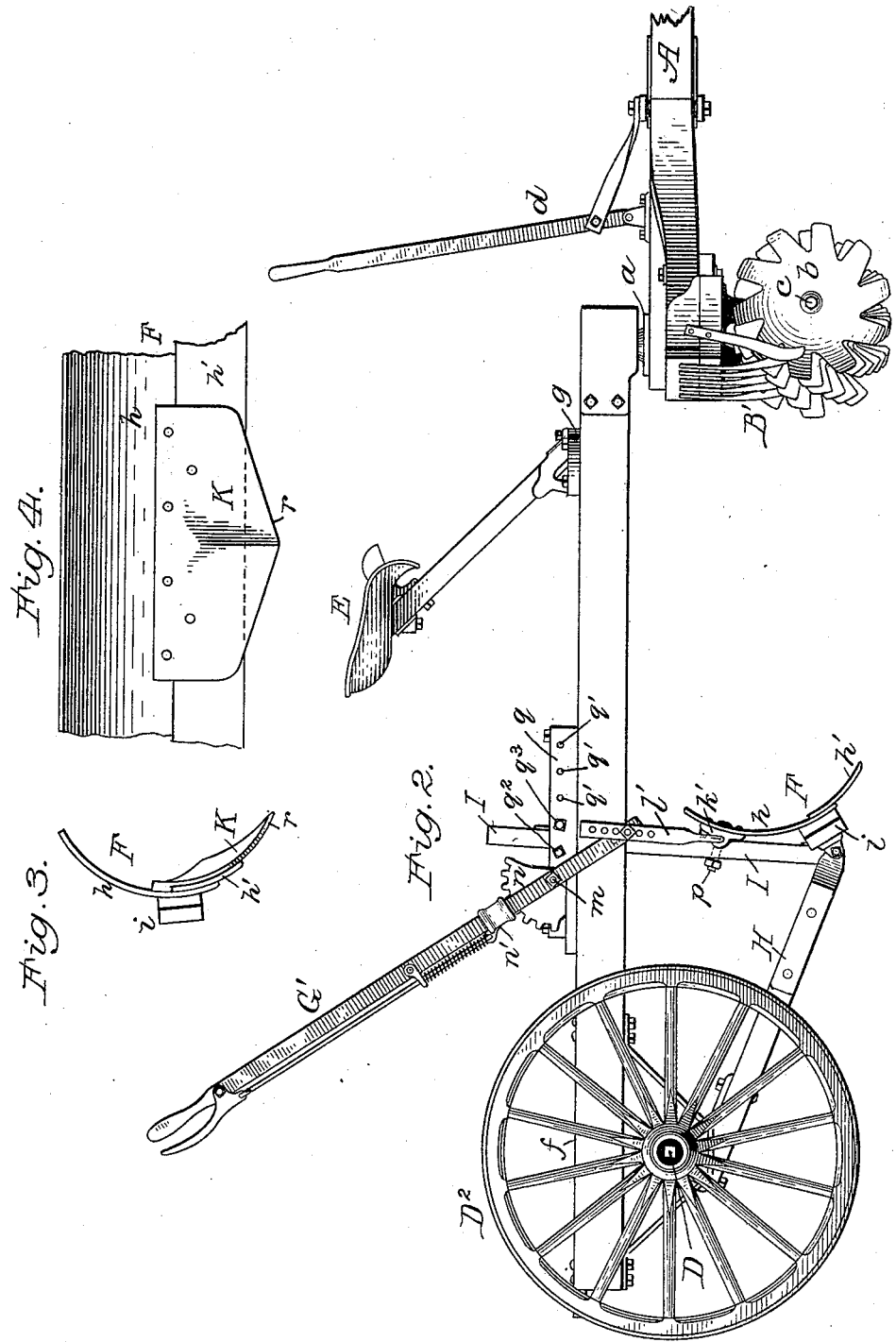
Attest:
Philip F. Larner
Lowell Bartlett
Inventor:
George Marshall Clark
By [signature] Attorney

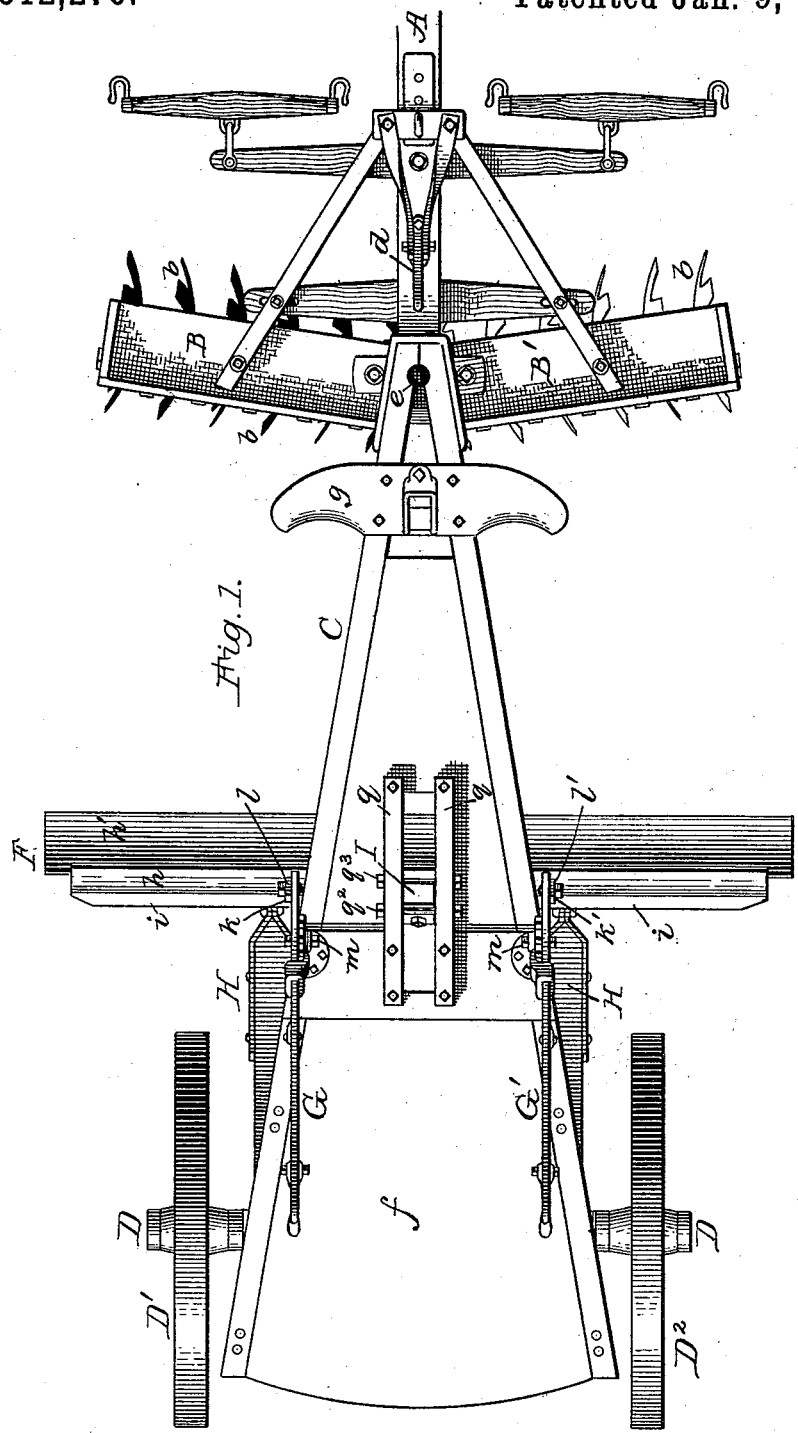

UNITED STATES PATENT OFFICE.

GEORGE MARSHALL CLARK, OF HADDAM, CONNECTICUT.

SOIL-WORKING MACHINE.

SPECIFICATION forming part of Letters Patent No. 512,276, dated January 9, 1894.

Application filed October 8, 1892. Serial No. 448,215. (No model.)

*To all whom it may concern:*

Be it known that I, GEORGE MARSHALL CLARK, of Higganum, in the town of Haddam, county of Middlesex, and State of Connecticut, have invented a certain new and useful Soil-Working Machine; and I do hereby declare that the following specification, taken in connection with the drawings furnished and forming a part of the same, is a clear, true, and complete description of my invention.

The prime object of my invention, is the production of a machine, which while performing good soil working duty, in the way of preparation for ordinary crops, will also during each use, be more or less effective in leveling up the surface of the worked land, the consequent object being, to thereby not only avoid the unequal tillage incident to uneven ground, but also obviating derangement of crops by undue collections of surface water, during storms, and forming in a field, what are sometimes termed "sink holes" and "hog wallows." In many instances, good fields have very irregular and wave like surfaces, and notwithstanding regular tillage, little or no leveling occurs therein, and this is especially true, when the depressions so communicate with each other, as to enable flowage from the shallow to the deep depressions. It was with special reference to the working of such fields, that I devised and constructed the first machine embodying my present invention. In many instances, when prompt leveling effects were desired, very uneven and "wallowy" fields have been completely leveled, and tilled to a high degree, with three or four cross workings, by one of my machines.

A machine embodying the main feature of my invention, contains a gang of rotary disk shares, and a co-operating scraper blade. The scraper blade is pendent from and vertically adjustable with reference to a frame, having supporting and controlling wheels, the latter being on an axle; the disk plow shares with their axles, serve also as the front guiding support for the blade and its frame. The disk plow shares, being angular to the line of draft, and also angularly adjustable, can be made to operate to any desired depth in the soil, and the scraper blade, being also capable of proper adjustment, with reference to its supporting frame and to the surface of the ground can be made to engage with any desired proportion of the soil worked up by the shares, and to displace more or less of the soil, to such points as are below the crests of the undulations.

My machines, although specially designed for tillage, are not limited in their capacities to that duty, but are well adapted to the making and repairing of roads, because by setting the plow shares, so as to operate as mere scarifiers of the surface, they will yet serve as the front supporting wheels of the machine, and such working would be desirable, when operating on race tracks, or on roads which require but little working; while on new roads, the disk shares may be made to promptly perform heavy cutting duty, whenever required, and as promptly restricted to a mere carrying duty. In the working of fields which are to be irrigated, my machines are specially effective, because after working for tillage alone, the machine can be employed in forming shallow ditches, although for this special line of duty, the scraper blade may well be provided with an attachment, or be specially organized for effecting a mode of displacement, not needed for tillage and leveling; although the machine with its ordinary leveling blade, if skillfully operated, can be made to perform good service in making irrigation ditches.

Considered solely as a road making and repairing machine, mine differs from any other known to me, in that the leveling blade is supported by and adjustably suspended from, a frame which is carried and supported in front by rotary soil working devices, and at the rear by carrying wheels, so that by means of hand levers, either end of the blade can be lifted or lowered, and also so that the blade can be tilted forwardly or backwardly and so made to operate either as a mere scraper, or both as a scraper and a carrier of soil, as distinguished from prior road making machines, which embody rotary soil working devices, and a trailing scraper, which in operation conforms to surface undulations, although provided with a caster wheel adjacent to the blade, and with a lever for forcing the wheel downward, and thereby lifting both the frame work and the blade, which are firmly and rigidly connected, so that the blade cannot be moved independently of said frame work.

Considered solely as a tillage machine, for the working and leveling of crop soils, my machines differ in many ways from such prior machines as embody shares of any of the various kinds, and a drag bar or leveler, in that the latter can only follow the general surface of the worked soil, whereas my scraper blade is a lifter, and carrier, and is suspended between a front and a rear support, and cannot drop into every depression, but will simply fill each of them, more or less, with soil which it displaces from adjacent crests.

In operation, my disk plow shares not only do their tillage work, but they prepare the surfaces of crests, so that the scraper blade need then operate as a mere displacer of loose soil, and said blade, whenever it displaces such loose soil, enables the plow shares when they next operate on the same crests, to cut them deeper, and more effectually than would be possible if the loosened soil had not been so displaced and carried into adjacent depressions.

After describing the machine illustrated in the drawings, the several features deemed novel, and of my own invention, will be duly specified in the several clauses of claim, hereunto annexed.

Referring to the drawings—Figures 1 and 2, illustrate one of my machines, respectively in plan and side elevation. Fig. 3, illustrates the scraper bar with a ditching spade applied thereto. Fig. 4, illustrates the blade and its spade attachment in front view.

The duty to be performed with machines of this type, is sometimes quite heavy, and hence they are strongly built, and require at least double teams for operating them.

The pole A, is mounted centrally upon a coupling plate $a$, pivotally uniting the gang frames B, B', of a disk harrow, or a plow, the disks being arranged in two gangs, and angularly adjustable with reference to the pole, as in ordinary disk harrows. The shares, or disks $b$, are here shown to be of the toothed or bladed variety, as heretofore patented to me, such being preferable for general service, although if they be plain concaved disks, they may be relied upon for good service, on specially soft soils. So far as relates to this portion of the organization, the disks, their clearers, their axles $c$, $c$, their gang frames and their adjusting lever $d$, are as heretofore in some prior disk harrows, but the pole at its rear end, is provided with a king bolt $e$, and a suitable base, for affording a free connection and pivotal support for the narrow front end of the scraper, or leveler frame C, which is long, triangular, and at its rear end, is provided with a platform or foot board, as at $f$. This frame is mainly supported upon an axle D, and wheels D' D². The driver's seat E, with a foot board $g$, is located near the front end of the frame C.

The scraper blade F, is straight, and is arranged centrally and crosswise of the machine, but vertically concaved at its face, and it consists of a heavy foundation iron plate $h$, and a steel working plate $h'$, the two being secured together by means of rivets or bolts having countersunk heads on the front surface of the blade. The blade is strongly reinforced at its back, by a beam $i$, which is nearly as long as the blade, and the whole is flexibly suspended from the frame C, and braced from the rear axle as follows: Two widely separated eye plates at $k$, $k'$, are firmly bolted to the rear side of the blade, near its top, with which two links $l$, $l'$, flexibly engage, and these latter are each provided with a series of bolt holes, which enables a flexible connection therewith of the lower ends of two adjusting hand levers G, G', respectively pivoted, as at $m$, $m$, to the sides of the overlying frame C. Each hand lever at its foot, has the usual toothed segment plate $n$, and a spring latch $n'$, to engage therewith, in a manner well known. The weight of the blade is thus wholly borne by the links, and is capable of being adjusted in a horizontal position at any desired height, with relation to the tread of the wheels, or to have one end of the blade higher than the other, as is sometimes desirable. The blade is rearwardly braced, by means of two heavy brace bars H, H, each flexibly connected with the blade beam $i$, and each, has at its rear end, a heavy strap which loosely embraces the rear axle, so that while each bar is a reliable thrust brace, it does not restrict the desired freedom, of the blade adjusting movements.

Now for enabling the blade, to be tilted forwardly and backwardly, and to be set with its working edge at various positions with respect of a vertical plane, it is centrally coupled by a loose bolt connection, at $p$, with a guide bar I, which at its lower end, extends to and bears against the rear surface of the brace beam $i$, and at its upper end, projects upward through a slot centrally located in the frame C. At each side of this slot, there are side blocks, or plates $q$, firmly bolted on top of the frame, and provided with a series of lateral registering bolt holes as at $q'$, for the reception of a pair of bolts $q^2$, $q^3$, between which the guide bar I, can freely slide either vertically or angularly. With the guide bolts $q^2$, $q^3$, in the position shown in Fig. 2, it will be seen that the leveling blade, has its working edge well advanced, but that if said bolts were placed in either of the other bolt holes, the top of the blade would be correspondingly advanced, and the working edge retired, thus enabling the blade to be adjusted for adapting it to the various conditions, incident to different kinds of soil. By the manipulation of either hand lever, the leveling blade can be tilted longitudinally, so as to operate in an inclined plane, as is frequently important, and so also is the capacity of the blade to be tilted forwardly and backwardly.

With the leveling blade so elevated, that it cannot engage too heavily with the soil, and in fields free from heavy stones and bowlders, the machine can be operated wholly by the driver, but generally the most effective service, will be performed, if a second man, standing on the foot board, attends the hand levers which control the leveling blade, and raises or lowers it, according to the immediate and constantly varied requirements.

It is not to be understood, that this machine has practical value only for working unevenly surfaced fields, because on a level field, the leveling blade can be made to perform good service, in cutting lumps of soil and roots, as well as a gatherer of such small loose stones, as may have been displaced by the shares. For traveling from place to place, the disk gangs as is usual with disk harrows and plows, are set at right angles to the pole, and the leveling blade fully elevated. In some machines, the disks are quite large, in which case the front end of the frame C, is provided with a goose neck coupling for avoiding an undue inclination of the frame. Shallow ditches for irrigating purposes, may be readily formed during the working of the soil parallel to the ditch line, by the use of a spade attachment, which is readily bolted to the center of the leveling blade, at its front side, as indicated in Figs. 3 and 4. The spade attachment K, has a lower or working edge at r, of such contour as will assure a ditch of proper depth, with sloping sides, and the thorough working of the soil at the two sides of the ditch, and the adjacent leveling, is conducive to favorable lateral distribution of water by absorption. If the machine be unprovided with this ditching attachment, it can be successfully operated, if after first working the soil in a direction parallel with the desired ditch lines, it is then worked at right angles thereto, the operator on approaching each line, gradually depressing the blade and then raising it, and thus at each cut, forming the ditch to a length corresponding to a little less, than the length of the leveling blade.

In some of my machines, I employ disk shares, quite large in diameter, and provide them with mold boards, as in rotary disk plowing machines, heretofore devised and patented by me, and in the operation of such machines, the turned furrows are well sliced, disintegrated, and leveled by the blade F.

Having thus described my invention, I claim as new and desire to secure by Letters Patent—

1. In a soil working machine, the combination substantially as hereinbefore described, of a gang of revolving disk shares; a pair of wheels and an axle; a frame supported and carried at its ends by said wheels, and disks, and a leveling blade which is suspended from, and crosswise of, said frame, and is vertically adjustable with reference thereto.

2. In a soil working machine, the combination substantially as hereinbefore described, of a gang of revolving disk shares; a pair of wheels and an axle; a frame supported at its ends by said shares and wheels; and a leveling blade braced from said axle, and suspended crosswise and centrally from the frame by means of a pair of band levers and links, which enable said blade to be bodily lifted and lowered, and to be tilted longitudinally independently of the frame.

3. In a soil working machine, the combination substantially as hereinbefore described, of a gang of revolving disk shares, and at the rear thereof, a vertically adjustable leveling blade which is vertically concaved at its face, and is adapted to be tilted forwardly and rearwardly, for varying its soil carrying capacity.

GEORGE MARSHALL CLARK.

Witnesses:
CLINTON B. DAVIS,
WELLINGTON H. WART.